(12) United States Patent
Sugihara et al.

(10) Patent No.: US 12,108,001 B2
(45) Date of Patent: Oct. 1, 2024

(54) INPUT DEVICE THAT SETS BUTTON BASELINE VALUE OR PANEL BASELINE VALUE TO INITIAL VALUE, DEPENDING ON WHETHER TOUCH OPERATION ON TOUCH BUTTON BASED ON ELECTROSTATIC CAPACITANCE IS VALID, AND IMAGE FORMING APPARATUS

(71) Applicant: KYOCERA Document Solutions Inc., Osaka (JP)

(72) Inventors: Tomoyoshi Sugihara, Osaka (JP); Fumiaki Takiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/378,176

(22) Filed: Oct. 10, 2023

(65) Prior Publication Data
US 2024/0129414 A1  Apr. 18, 2024

(30) Foreign Application Priority Data
Oct. 18, 2022  (JP) ................................. 2022-167143

(51) Int. Cl.
*H04N 1/00* (2006.01)
*G06F 3/041* (2006.01)
*G06F 3/044* (2006.01)

(52) U.S. Cl.
CPC ....... *H04N 1/00411* (2013.01); *G06F 3/0418* (2013.01); *G06F 3/044* (2013.01)

(58) Field of Classification Search
CPC .......... G06F 3/016; G06F 3/042; G06F 3/044; G06F 3/04812; G06F 3/0482; G06F 3/04842; G06F 3/04883; G06F 3/04886; G06F 3/1253; G06F 2203/04108; G06F 3/0416; G06F 3/0418; G06F 3/04186; G06F 3/0488; H04N 1/00411; H04N 1/00037;

(Continued)

(56) References Cited

U.S. PATENT DOCUMENTS

| | | | |
|---|---|---|---|
| 2020/0409491 A1* | 12/2020 | Maharyta | G06F 3/04166 |
| 2021/0072936 A1* | 3/2021 | Funakawa | G06F 3/016 |
| 2024/0094869 A1* | 3/2024 | Tanabe | G06F 3/0482 |

FOREIGN PATENT DOCUMENTS

JP  2009123524 A  6/2009

* cited by examiner

*Primary Examiner* — Nelson M Rosario
(74) *Attorney, Agent, or Firm* — IP Business Solutions, LLC (57) ABSTRACT

An input device includes a touch panel, a touch button, a first measurement device, a second measurement device, a first detection device that detects a touch position on the touch panel, based on a difference between the electrostatic capacitance measured by the first measurement device and a panel baseline value, a second detection device that detects a touch operation on the touch button, based on a difference between the electrostatic capacitance measured by the second measurement device and a button baseline value, an error decision device that decides that the touch operation is an error, when the touch operation satisfies a predetermined condition, and a controller that sets the button baseline value to an initial value, when the error decision device has identified an error, and sets the panel baseline value to an initial value, when the error decision device has not identified an error.

6 Claims, 5 Drawing Sheets

(58) Field of Classification Search
CPC ........... H04N 1/00352; H04N 1/00392; H04N 1/00397
See application file for complete search history.

INPUT DEVICE THAT SETS BUTTON BASELINE VALUE OR PANEL BASELINE VALUE TO INITIAL VALUE, DEPENDING ON WHETHER TOUCH OPERATION ON TOUCH BUTTON BASED ON ELECTROSTATIC CAPACITANCE IS VALID, AND IMAGE FORMING APPARATUS

INCORPORATION BY REFERENCE

This application claims priority to Japanese Patent Application No. 2022-167143 filed on Oct. 18, 2022, the entire contents of which are incorporated by reference herein.

BACKGROUND

The present disclosure relates to an input device including a touch panel and a touch button based on an electrostatic capacitance method, and to an image forming apparatus.

Touch panels or touch buttons based on the electrostatic capacitance method have come to be widely used as interfaces for various electronic devices or apparatuses. Such touch panels or touch buttons are configured to measure electrostatic capacitance with respect to an operating body such as a user's finger or a touch pen, to thereby detect whether a touch operation has been performed, on the basis of a difference between the measured electrostatic capacitance and a baseline value. For example, a technique related to a device provided with a plurality of touch panels based on the electrostatic capacitance method is known.

SUMMARY

The disclosure proposes further improvement of the foregoing techniques.

In an aspect, the disclosure provides an input device including a touch panel based on an electrostatic capacitance method, a touch button based on the electrostatic capacitance method, a first measurement device, a second measurement device, and a control device. The first measurement device measures electrostatic capacitance between the touch panel and an operating body. The second measurement device measures electrostatic capacitance between the touch button and the operating body. The control device includes a processor, and acts as a first detection device, a second detection device, an error decision device, and a controller, when the processor executes a control program. The first detection device detects a touch position of the operating body on the touch panel, on a basis of a difference between the electrostatic capacitance measured by the first measurement device and a panel baseline value. The second detection device detects whether a touch operation has been performed on the touch button, on a basis of a difference between the electrostatic capacitance measured by the second measurement device and a button baseline value. The error decision device decides that the touch operation detected by the second detection device is an error, when the touch operation detected by the second detection device satisfies a predetermined condition. The controller sets the button baseline value to a predetermined initial value, when the error decision device decides that the touch operation detected by the second detection device is an error, and sets the panel baseline value to a predetermined initial value, when the error decision device decides that the touch operation is not an error.

In another aspect, the disclosure provides an image forming apparatus including the foregoing input device, and an image forming device. The image forming device prints an image on a sheet.

DETAILED DESCRIPTION

Figure 1:
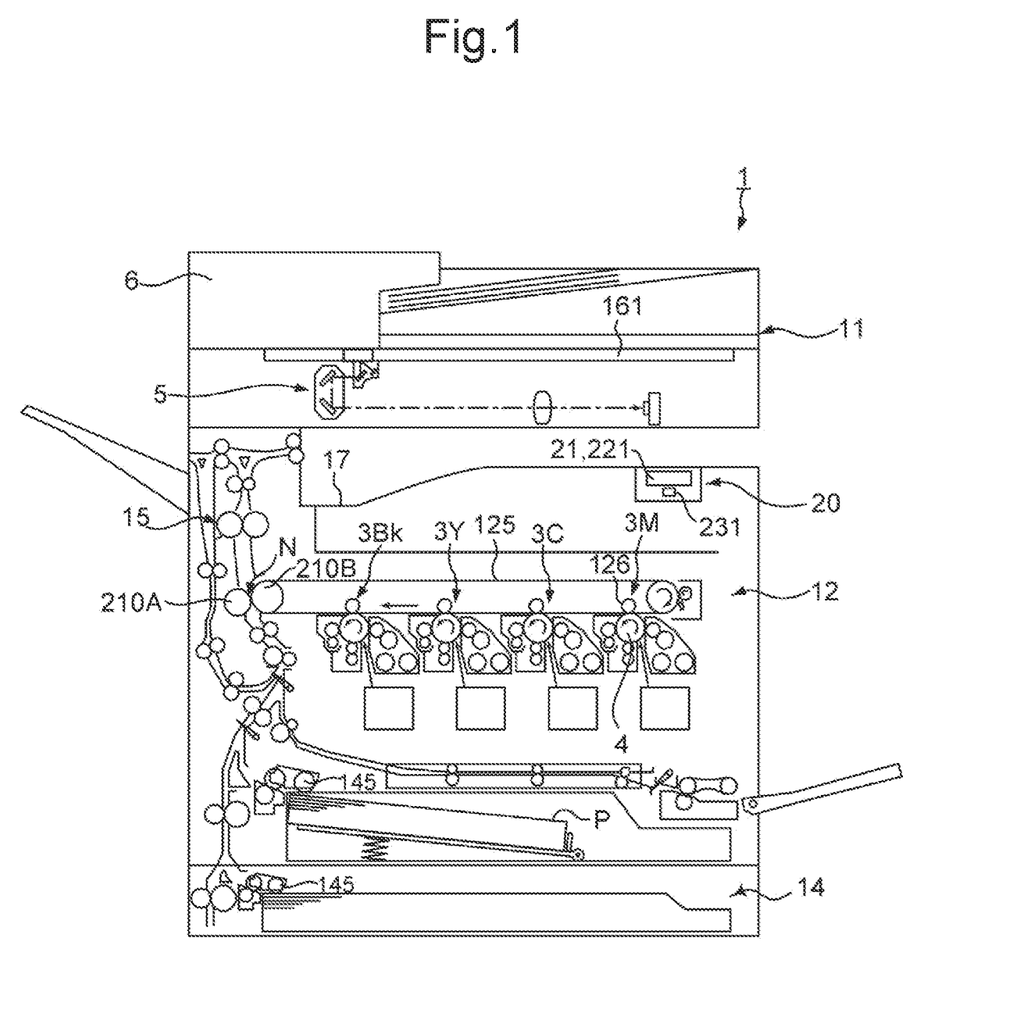
FIG. 1 is a front cross-sectional view showing a structure of an image forming apparatus.

Hereafter, an input device and an image forming apparatus according to an embodiment of the disclosure will be described, with reference to the drawings. FIG. 1 is a front cross-sectional view showing a structure of the image forming apparatus 1, including the input device 2 according to the embodiment of the disclosure.

The image forming apparatus 1 may be a multifunction peripheral having a plurality of functions, such as copying, printing, scanning, and facsimile transmission, or a copier having the facsimile function. Although an image forming apparatus based on an electrophotography method is taken up in the following embodiment, the disclosure is also applicable to an image forming apparatus of a different type, for example an ink jet printer.

The image forming apparatus 1 includes an image reading device 11 including an image reading device 5, an operation panel 20, an image forming device 12, a fixing device 15, a sheet feeding device 14, and a document feeding device 6. The operation panel 20 is located on the front face of the apparatus main body. The operation panel 20 displays an operation screen or messages. The operation panel 20 includes a touch panel 221 based on the electrostatic capacitance method, and a display device 21 unified with the touch panel 221. In addition, the operation panel 20 includes a touch button 231, also based on the electrostatic capacitance method. The operation panel 20 may further include hard keys having different functions.

The display device 21 is, for example, constituted of a liquid crystal display (LCD) or an organic light-emitting diode (OLED) display.

When the image reading device 11 performs the scanning operation, the image reading device 5 optically reads the image on the source document, delivered from the document feeding device 6, or placed on a first platen glass 161, and acquires the image of the document. The document image acquired by the image reading device 5 is stored in an image memory 91 shown in FIG. 2

When the image forming apparatus 1 performs the printing operation, the image forming device 12 forms a toner image on a sheet P supplied from the sheet feeding device 14, on the basis of the document image acquired through the scanning operation, or image data acquired from an external device, via a communication controller 93 to be subsequently described.

In the case of color printing, an image forming unit 3M for magenta, an image forming unit 3C for cyan, an image forming unit 3Y for yellow, and an image forming unit 3Bk for black in the image forming device 12 each form a toner image on a photoconductor drum 4, on the basis of the image formed of the corresponding color component, through charging, exposing, and developing processes, and such toner image is transferred onto an intermediate transfer belt 125, via a primary transfer roller 126.

The toner images of the respective colors are superposed at an adjusted timing on the intermediate transfer belt 125, upon being transferred thereon, so as to form a colored toner image. A secondary transfer roller 210A transfers the colored toner image formed on the surface of the intermediate transfer belt 125, onto the sheet P transported from the sheet feeding device 14, at a nip region N between a drive roller 210B and the intermediate transfer belt 125.

The fixing device 15 fixes the toner image on the sheet P, by thermal compression. Upon undergoing the fixing process, the sheet P having the colored image formed thereon is delivered to an output tray 17.

The sheet feeding device 14 includes a plurality of sheet cassettes. A controller 101 to be subsequently described drives one of pickup rollers 145 provided for the respective sheet cassettes, so as to transport the sheet P in the corresponding sheet cassette, toward the nip region N.

Figure 2:
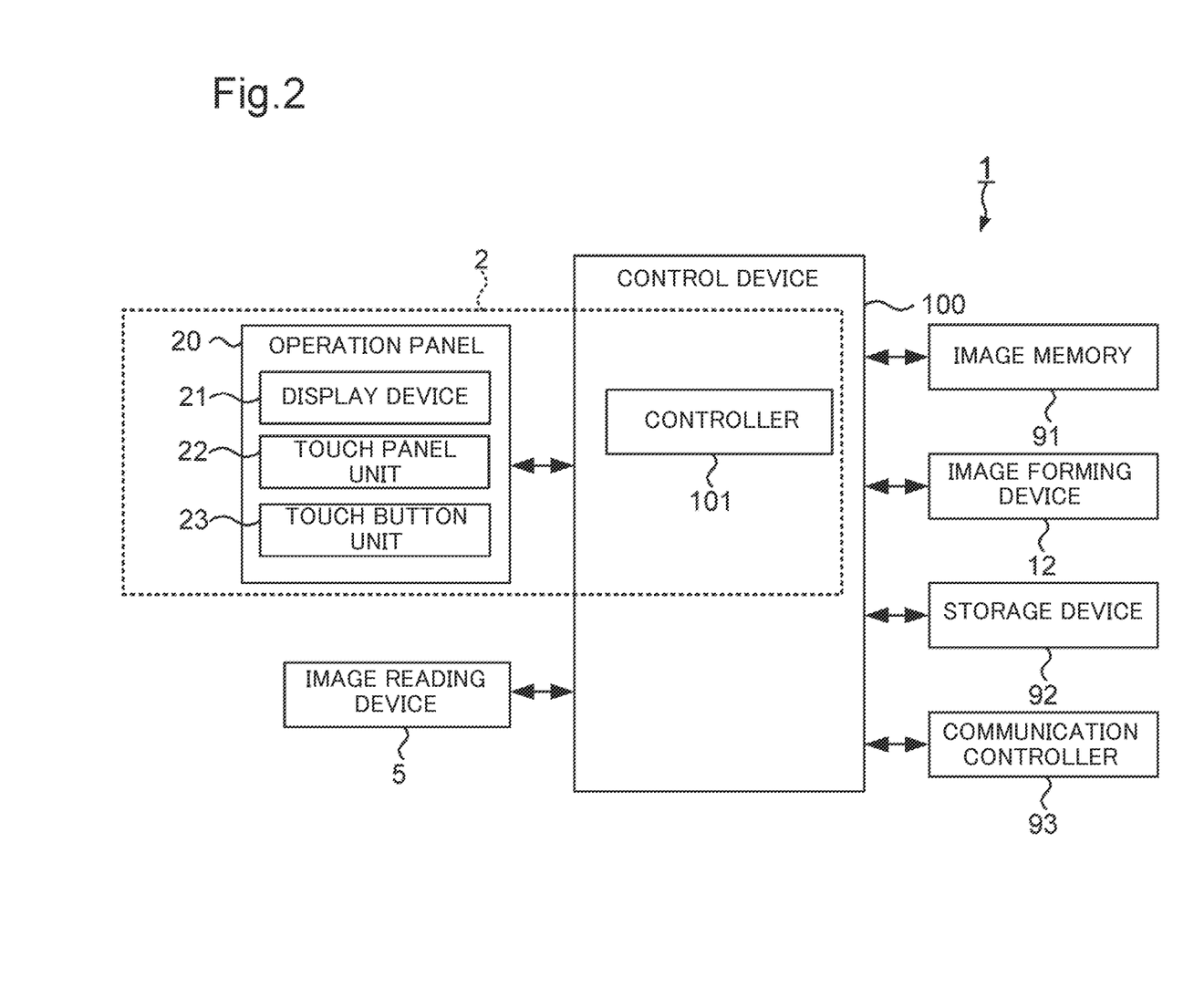
FIG. 2 is a block diagram showing an electrical configuration of the image forming apparatus.

FIG. 2 is a block diagram showing the electrical configuration of the image forming apparatus 1. The description of those elements already cited with reference to FIG. 1 will not be repeated.

The image forming apparatus 1 includes a storage device 92, which is a large-capacity memory unit constituted of a solid state drive (SSD) or a hard disk drive (HDD). In the storage device 92, the image data, various programs, and data tables are stored.

The communication controller 93 is constituted, for example, of a communication module. The communication controller 93 transmits and receives various types of data with external devices, via a network connected to the communication controller 93.

The control device 10 includes a processor, a random-access memory (RAM), and a read-only memory (ROM). The processor is, for example, central processing unit (CPU), micro processing unit (MPU), or an application specific integrated circuit (ASIC). The control device 100 acts as the controller 101, a first detection device 223, a second detection device 233, and an error decision device 236, each of which will be subsequently described, when the processor executes a control program stored in the ROM. The controller 101 serves to control the overall operation of the image forming apparatus 1. Here, the controller 101, the first detection device 223, the second detection device 233, and the error decision device 236 may each be constituted in the form of a hardware circuit, instead of being realized by the operation of the controller 101 according to the control program. This also applies to other embodiments, unless otherwise specifically noted.

The operation panel 20 includes a display device 21, a touch panel unit 22 having a touch panel 221, and a touch button unit 23 having a touch button 231. The operation panel 20 and the controller 101 constitute the input device according to the disclosure.

Figure 3:
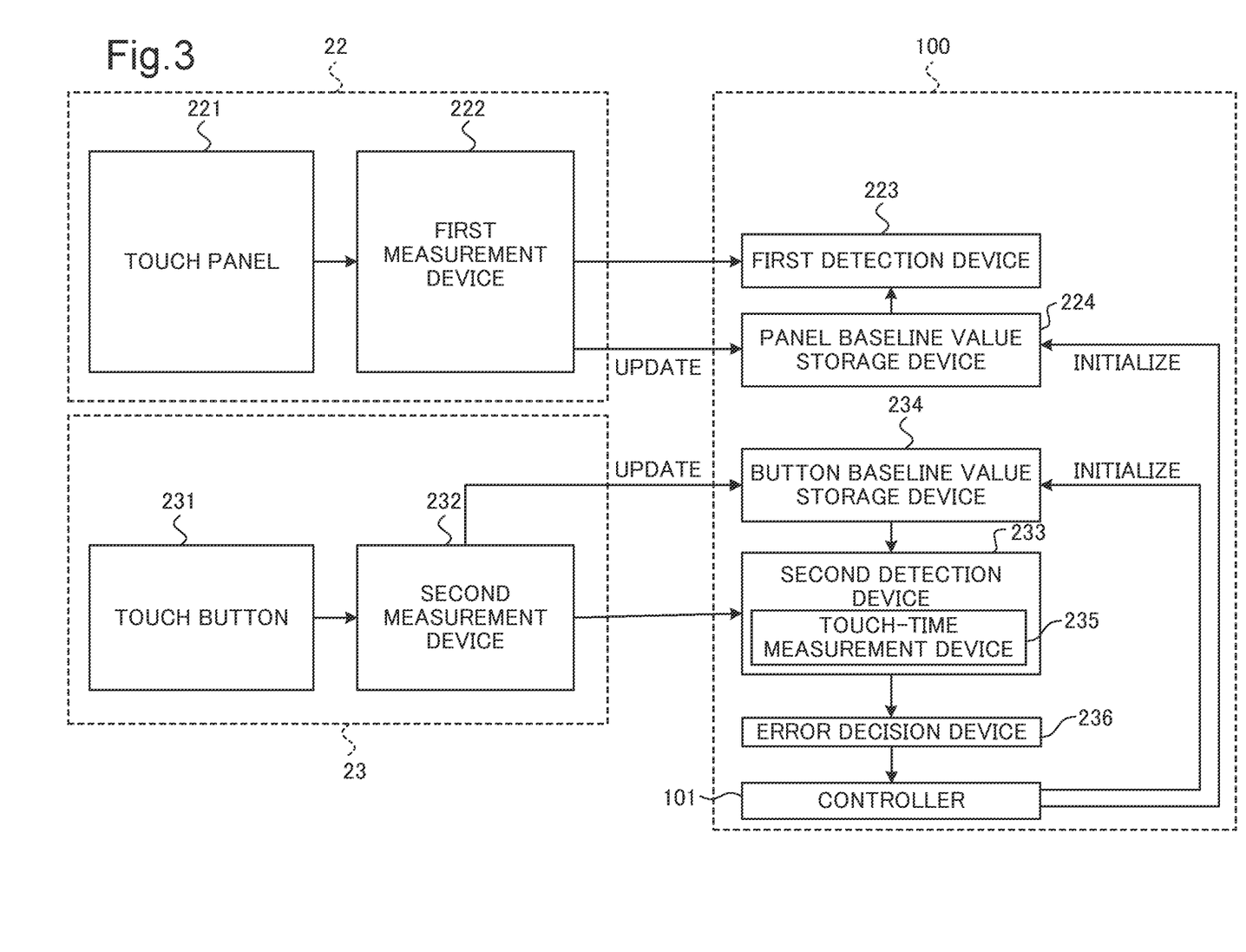
FIG. 3 is a block diagram showing an electrical configuration of a touch panel unit and a touch button unit.
Figure 4:
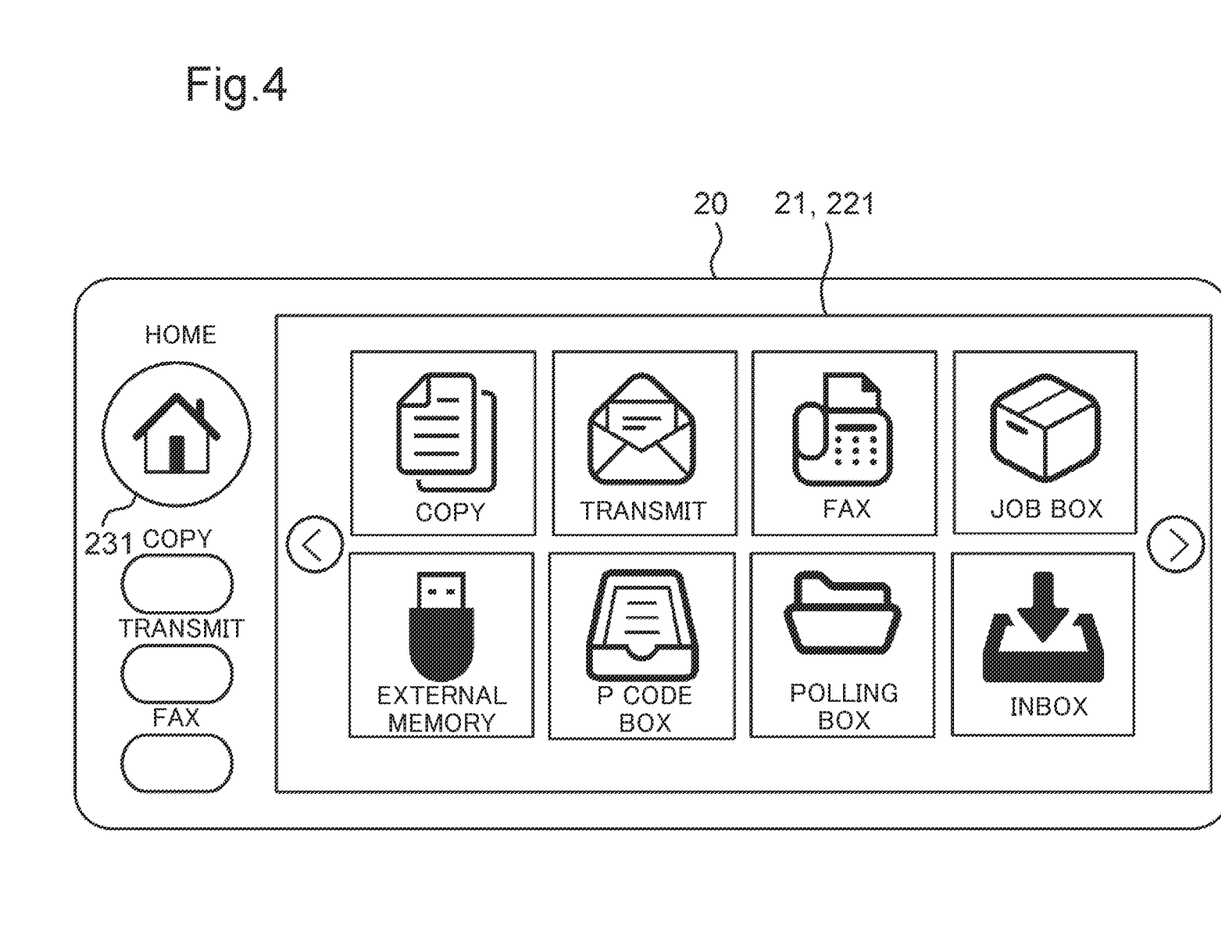
FIG. 4 is a schematic drawing showing an example of contents displayed on a display device.

FIG. 3 is a block diagram showing the electrical configuration of the touch panel unit 22 and the touch button unit 23. FIG. 4 illustrates the appearance of the operation panel 20. The touch panel unit 22 includes the touch panel 221 and a first measurement device 222. A panel baseline value storage device 224 is for storing a panel baseline value. The panel baseline value storage device 224 is, for example, a non-volatile memory incorporated in the control device 100. In the touch panel 221, a plurality of electrostatic capacitance sensors are arranged in rows and columns. The first measurement device 222 measures the capacitance of each of the electrostatic capacitance sensors arranged in the touch panel 221. The first measurement device 222 includes, for example, an electrostatic capacitance measurement circuit based on a constant-current discharge method, or a circuit that acts similarly to a tester. The first detection device 223 calculates a difference between a measured value acquired by the first measurement device 222 and the panel baseline value stored in the panel baseline value storage device 224, and detects a touch position, depending on whether the calculated difference is equal to or larger than a threshold.

The touch button unit 23 includes the touch button 231 and a second measurement device 232. The button baseline value storage device 234 is for storing a button baseline value. The touch button unit 23 is, for example, a non-volatile memory incorporated in the control device 100. A touch-time measurement device 235 measures the time during which the touch button 231 is touched (pressed down). The touch-time measurement device 235 is, for example, a timer incorporated in the control device 100. The touch button 231 is a button based on the electrostatic capacitance method, which is a hard key frequently operated by the user (e.g., home button). The touch-time measurement device 235 includes an electrostatic capacitance sensor.

The second measurement device 232 measures the capacitance of the electrostatic capacitance sensor provided in the touch button 231. The second measurement device 232 includes, for example, an electrostatic capacitance measurement circuit based on a constant-current discharge method, or a circuit that acts similarly to a tester. The second detection device 233 detects a touch operation performed on the touch button 231, on the basis of the capacitance of the electrostatic capacitance sensor measured by the second measurement device 232. The second detection device 233 calculates a difference between a measured value acquired by the second measurement device 232 and the button baseline value stored in the button baseline value storage device 234, detects whether a touch operation has been performed, depending on whether the calculated difference is equal to or larger than a threshold, and outputs the detection result to the error decision device 236.

The touch-time measurement device 235 measures the time after the second detection device 233 has detected the touch operation on the touch button 231, and before the second detection device 233 detects that the touch operation has been finished.

The error decision device 236 decides whether the second detection device 233 has made a detection error, on the basis of the detection result outputted by the second detection device 233 and the time measured by the touch-time measurement device 235.

To be more specific, the touch-time measurement device 235 measures the time after the second detection device 233 has detected the touch operation on the touch button 231, and before the second detection device 233 detects that the touch operation has been finished. Then in the case where the measured time is shorter than a predetermined on/off valid time (e.g., in a range of 0.01 to 0.05 sec.), or longer than a predetermined hold-down valid time (e.g., in a range of 0.1 to 5.0 sec.), the error decision device 236 decides that the touch operation detected by the second detection device 233 is an error. Further, in the case where the number of times that the second detection device 233 has outputted the detection result, within a predetermined time, is equal to or larger than a predetermined number of times (e.g., five times within 1 sec.), the error decision device 236 decides that the touch operation detected by the second detection device 233 is an error.

The baseline value refers to, for example, a capacitance value of the electrostatic capacitance sensor (measured value from the first measurement device 222, or the second measurement device 232), acquired in the state where an operating body, such as a user's finger or a touch pen, is not in contact with the touch panel 221 or the touch button 231 (touch operation is not being performed). The first measurement device 222 measures the capacitance value when the touch operation is not being performed, and the panel baseline value storage device 224 updates the panel baseline value thus far stored, to the capacitance value that has been measured. Likewise, the second measurement device 232 measures the capacitance value when the touch operation is not being performed, and the button baseline value storage device 234 updates the button baseline value thus far stored, to the capacitance value that has been measured. Such updating operation is periodically performed, under the control of the controller 101.

The difference calculated by the first detection device 223 or the second detection device 233 (measured electrostatic capacitance—baseline value) becomes nearly zero when the touch operation is not being performed on the touch panel 221 or the touch button 231, and becomes a larger value when the touch operation is performed. The first detection device 223 or the second detection device 233 detects whether the touch operation has been performed, on the basis of the comparison between the calculated difference and the predetermined threshold, and therefore the touch operation is unable to be correctly detected, unless the baseline value is accurate.

However, the touch panel 221 or the touch button 231, which depends on the electrostatic capacitance method, is susceptible to an electrical noise. When the baseline value is updated as above, under the influence of the noise, the fluctuation of the relation in magnitude between the difference and the threshold may provoke an erroneous detection of the touch operation. Such a drawback may be avoided, for example, by grounding the image forming apparatus 1 thereby minimizing the influence of the noise. However, there are users who utilize the image forming apparatus 1, without grounding the same.

Accordingly, it is preferable to determine the initial value of the panel baseline value and the button baseline value in advance, and cause the controller 101 to reset the baseline values, stored in the panel baseline value storage device 224 and the button baseline value storage device 234, to the initial value, when a predetermined condition is satisfied. Such an arrangement enables the baseline values to be constantly maintained at an appropriate value, despite the image forming apparatus 1 not being grounded. As result, the touch operation performed on the touch panel 221 and the touch button 231 can be correctly detected.

Figure 5:
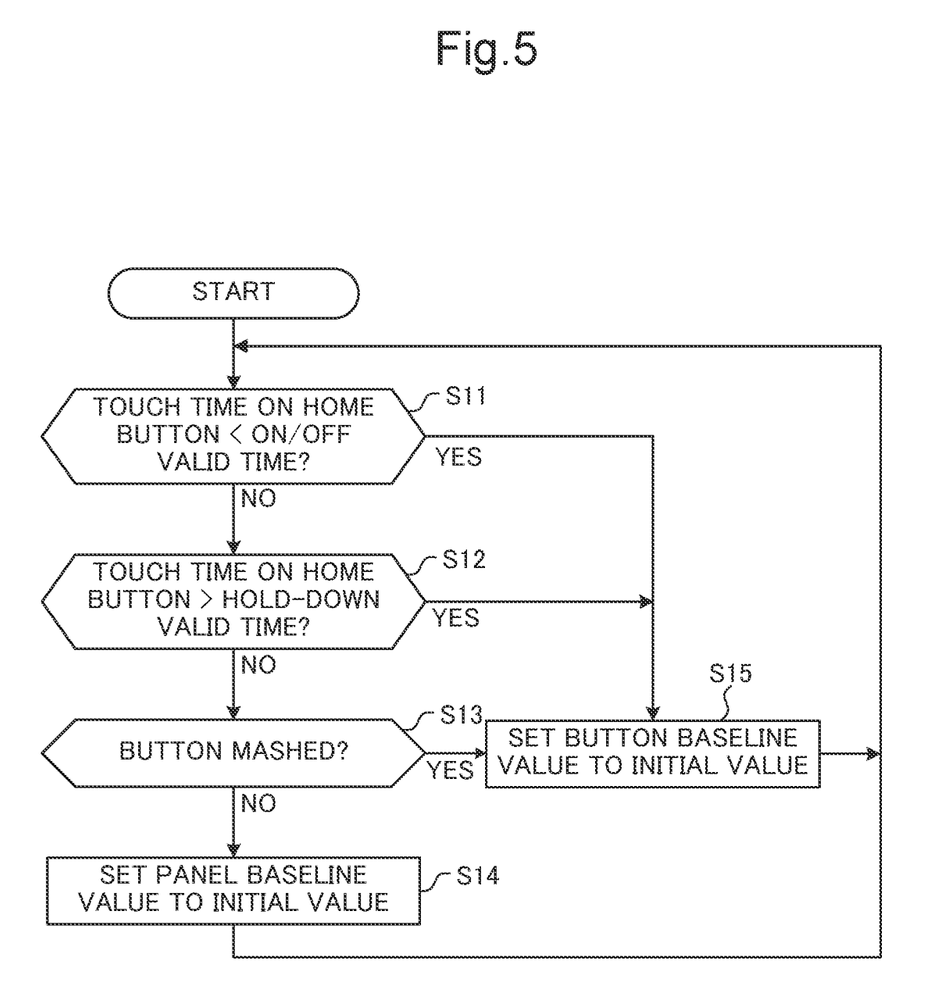
FIG. 5 is a flowchart showing an initialization process of a panel baseline value and a button baseline value.

Hereunder, an initialization process of the panel baseline value, and the button baseline value according to this embodiment, will be described in detail. FIG. 5 is a flowchart showing the initialization process. Here, it is preferable to also perform, at the same time as the initialization of the panel baseline value and the button baseline value described hereunder, the conventional updating operation, including updating the panel baseline value to the value of electrostatic capacitance of the touch panel 221, acquired when the touch operation is not being performed, and updating the button baseline value to the value of electrostatic capacitance of the touch button 231, acquired when the touch operation is not being performed.

First, when the second detection device 233 detects a touch operation performed on the touch button 231, the touch-time measurement device 235 measures the time after the detection of the touch operation, and before the second detection device 233 detects that the touch operation has been finished. When the time measured by the touch-time measurement device 235 is shorter than the predetermined on/off valid time (YES at step S11), the error decision device 236 decides that the touch operation detected by the second detection device 233 is an error. This decision represents, for example, the case where the on/off operation of the touch button 231 is repeated, at a speed that a human being is unable to realize.

There may be a case where, owing to the influence of noise, the second detection device 233 detects the on/off operation of the touch button 231, at such short intervals that a human's finger is unable to realize. Accordingly, a shortest possible interval between the touch operations that a human being can realize is specified in advance, as the on/off valid time, so that, when the time interval of the detected touch operations is shorter than such on/off valid time, the error decision device 236 decides that the touch operation detected by the second detection device 233 is an error.

On the other hand, when the time measured by the touch-time measurement device 235 is longer than the predetermined hold-down valid time (YES at step S12), the error decision device 236 decides that the touch operation detected by the second detection device 233 is an error.

There may be a case where, owing to the influence of noise, the second detection device 233 detects the touch operation of a long time on the touch button 231, despite that the user has not touched the touch button 231. Accordingly, the hold-down valid time is specified in advance, so that, when the duration of the touch operation detected by the second detection device 233 is longer than such hold-down valid time, the error decision device 236 decides that the detected touch operation is an error.

Further, when the second detection device 233 detects the touch operation (button mashing) the predetermined number of times or more, within the predetermined time (YES at step S13), the error decision device 236 decides that the detected touch operation is an error.

When the error decision device 236 decides that the touch operation is an error (YES at step S11, step S12, or step S13), the controller 101 sets the button baseline value stored in the button baseline value storage device 234, to the initial value (step S15). The initial value of the button baseline value is stored in advance, for example in a non-volatile memory incorporated in the control device 100, accessible by the controller 101.

In the case where the touch operation detected by the second detection device 233 is normal, in other words where the error decision device 236 has not decided that the touch operation is an error (NO at step S11, step S12, or step S13), the controller 101 sets the panel baseline value panel baseline value stored in the storage device 224, to the initial value (step S14). The initial value of the panel baseline value is stored in advance, for example in a non-volatile memory incorporated in the control device 100, accessible by the controller 101.

Now, since the touch panel or the touch button based on the electrostatic capacitance method, is susceptible to an electrical noise, some measures against the noise have to be taken. For example, grounding the apparatus can reduce the noise, but there are cases where the apparatus is not grounded. Besides, the grounding is not sufficient to completely eliminate the noise, and therefore another measure has to be taken. Further, when the operation panel is provided with both of the touch panel and the touch button, the measure against the noise has to be taken with respect to both.

According to the foregoing embodiment, however, when an error is detected with respect to the touch button 231, the controller 101 rewrites the button baseline value in the button baseline value storage device 234, to the initial value. In contrast, when the touch operation on the touch button 231 has been normally performed, the controller 101 rewrites the panel baseline value in the panel baseline value storage device 224, to the initial value.

Since the touch panel 221 serves to receive the inputs of instructions necessary for the operations or setting up of the image forming apparatus 1, an erroneous touch detection due to the noise disables the image forming apparatus 1 from operating correctly. Therefore, in addition to the conventional updating operation, including setting the electrostatic capacitance value of the touch panel 221, acquired when the touch operation is not being performed, as the panel baseline value, the controller 101 sets the panel baseline value to the initial value, each time the touch button 231 (home button), which is frequently operated by the user, is touched. Such an arrangement prevents the erroneous detection of the touch operation on the touch panel 221, arising from the updating operation of the panel baseline value, performed under the influence of the noise.

Although the home button was often mechanically operated, currently both of the touch button 231 and the touch panel 221 are based on the electrostatic capacitance method, and therefore the measure against the noise has to be taken, with respect to both of the touch button 231 and the touch panel 221. As described above, when the error decision device 236 decides that the second detection device 233 has performed an erroneous detection, the controller 101 sets the button baseline value to the initial value, and when the touch operation on the touch button 231 is normally performed, the controller 101 sets the panel baseline value to the initial value. Thus, the measure against the noise can be taken, with respect to both of the touch button 231 and the touch panel 221.

While the present disclosure has been described in detail with reference to the embodiments thereof, it would be apparent to those skilled in the art the various changes and modifications may be made therein within the scope defined by the appended claims.

What is claimed is:

1. An input device comprising:
    a touch panel based on an electrostatic capacitance method;
    a touch button based on the electrostatic capacitance method;
    a first measurement device that measures electrostatic capacitance between the touch panel and an operating body:
    a second measurement device that measures electrostatic capacitance between the touch button and the operating body; and
    a control device including a processor, and configured to act, when the processor executes a control program as:
        a first detection device that detects a touch position of the operating body on the touch panel, on a basis of a difference between the electrostatic capacitance measured by the first measurement device and a panel baseline value;
        a second detection device that detects whether a touch operation has been performed on the touch button, on a basis of a difference between the electrostatic capacitance measured by the second measurement device and a button baseline value;
        an error decision device that decides that the touch operation detected by the second detection device is an error, when the touch operation detected by the second detection device satisfies a predetermined condition; and
        a controller that sets the button baseline value to a predetermined initial value, when the error decision device decides that the touch operation detected by the second detection device is an error, and sets the panel baseline value to a predetermined initial value, when the error decision device decides that the touch operation is not an error,
    wherein the input device is configured to periodically perform an updating operation, in which:
    the first measurement device measures an electrostatic capacitance value when the touch operation is not being performed, and the controller updates the panel baseline value to the electrostatic capacitance value that has been measured; and
    the second measurement device measures the electrostatic capacitance value when the touch operation is not being performed, and the controller updates the button baseline value to the electrostatic capacitance value that has been measured.

2. The input device according to claim 1,
    wherein the control device further acts as a touch-time measurement device that measures a time after the second detection device has detected the touch operation on the touch button, and before the second detection device detects that the touch operation has been finished, and
    when the time measured by the touch-time measurement device is shorter than a predetermined on/off valid time, the error decision device decides that the touch operation detected by the second detection device is an error.

3. The input device according to claim 1,
    wherein the control device further acts as a touch-time measurement device that measures a time after the second detection device has detected the touch operation on the touch button, and until the second detection device detects that the touch operation has been finished, and
    when the time measured by the touch-time measurement device is longer than a predetermined hold-down valid time, the error decision device decides that the touch operation detected by the second detection device is an error.

4. The input device according to claim 1,
    wherein the second detection device detects the touch operation performed a predetermined number of times or more within a predetermined time, the error decision device decides that the touch operation detected by the second detection device is an error.

5. The input device according to claim 1,
    wherein the touch button includes a home button.

6. An image forming apparatus comprising:
the input device according to claim 1; and
an image forming device that prints an image on a sheet.

\* \* \* \* \*